Jan. 3, 1956  T. O. SUMMERS, JR  2,728,979
GYROSCOPIC CONTROL INSTRUMENT
Filed May 12, 1951  7 Sheets-Sheet 1

Fig.1.

THOMAS O. SUMMERS, JR.
INVENTOR.

BY R. E. Geangue

ATTORNEY

Jan. 3, 1956  T. O. SUMMERS, JR  2,728,979
GYROSCOPIC CONTROL INSTRUMENT
Filed May 12, 1951  7 Sheets-Sheet 5

THOMAS O. SUMMERS, JR.
INVENTOR.

BY R. E. Geaugue

ATTORNEY

Jan. 3, 1956     T. O. SUMMERS, JR     2,728,979
GYROSCOPIC CONTROL INSTRUMENT
Filed May 12, 1951     7 Sheets-Sheet 6

THOMAS O. SUMMERS, JR.
INVENTOR.

BY R. E. Geangue
ATTORNEY

Fig. 13.

THOMAS O. SUMMERS, JR.
INVENTOR.

BY R. E. Geangue
ATTORNEY

United States Patent Office 2,728,979
Patented Jan. 3, 1956

2,728,979

GYROSCOPIC CONTROL INSTRUMENT

Thomas O. Summers, Jr., Sherman Oaks, Calif.

Application May 12, 1951, Serial No. 225,996

30 Claims. (Cl. 74—5.34)

This invention relates to gyroscopic control instruments and more particularly to a reference gyroscope erected by a gravity sensitive device in pitch and by a direction sensitive gyroscopic device in roll. This type of erection is obtained by utilizing an electromagnetic device mounted upon a pendulous bail which is piovtally supported about the pitch axis of the aircraft or missile equipped with the invention. The electromagnetic device comprises two electromagnets mounted one on each side of the normally vertical plane, passing through the roll gimbal axis of the gyroscope. Energization of either magnet causes an eddy current drag upon the gyro rotor which will erect the spin axis to the vertical in pitch and simultaneously precesses the gyro about the roll axis in a direction which depends upon which magnet is energized. Erection of the reference gyroscope in roll is controlled by a rate gyroscope, mounted to sense turning of the aircraft in azimuth. When the aircraft is turning, the turn sensitive gyro will energize one of the two electromagnetic erectors to slowly precess the reference gyro about the roll axis until the aircraft stops turning. In addition to the electromagnets, the pendulous bail is equipped with a friction erector for rapidly erecting the spin axis of the reference gyro prior to the flight of the craft.

It previously has been the practice to utilize a gyroscope erected to the vertical in both pitch and roll by gravity sensitive devices. While such a device furnishes an excellent pitch reference about which an aircraft may be stabilized, it provides a roll reference which will maintain the wings of the aircraft horizontal instead of in the trimmed position near the horizontal at which the craft will fly straight. This is one reason why previous automatic control systems for aircraft, utilizing the conventional type gravity erected reference gyro, must rely on another directional guidance device to keep the course of the aircraft at least intermittently straight.

Automatic control systems having only one conventional type gyro to control the flight of the aircraft are sometimes employed in radio-controlled targets or missiles, but such systems depend upon visual, radar or some other aid to keep the craft on a straight course. When the radar plotting board is utilized as the only means of keeping the aircraft flying straight, it is sometimes unsafe to maneuver the aircraft for the reason that when the target is off course, the operator is not always certain whether this off-course position is the result of the aircraft having been headed on a straight course, but in the wrong direction, or whether the off-course condition is the result of a bank attitude to cause a turn or continuous heading change. Thus, the operator is at a loss as to whether to return the aircraft to its on-course position by trimming to a new roll attitude, or whether to return to course by a momentary roll, which would effect a heading change only. While it is entirely possible to keep a target aircraft somewhat on course by this method of control, for precise course flying it is imperative that the aircraft always fly straight in the absence of control so that the operator is assured whenever the aircraft is off course that the off course condition is the result of improper heading only, and is not the result of a banked condition, or in other words, improper roll attitude.

In order to overcome the disadvantages of prior control devices, the reference gyroscope of the present invention is erected about the roll axis of the craft in response to signals from the rate gyro. As long as the aircraft is turning, the rate gyro will cause the reference gyro to precess about the roll axis until the aircraft stops turning. The reference gyro will therefore assure a straight flight reference position about which the aircraft will fly straight and whenever the aircraft is off course, the off course condition can only result from an improper heading.

Since the reference gyro can be caged prior to flight by a friction erector positioned on the bail between the two electromagnetic erectors, the gyro spin axis can be rapidly case erected in roll to normally vertical plane, passing through the roll gimbal axis of the gyro and simultaneously erected in pitch to true gravity vertical. Caging the spin axis of the gyroscope to gravity vertical in pitch precludes the dangerous launching errors that are sometimes caused with gyros which are caged just prior to launching to the null position of the gyro reference, rather than to true vertical. With prior conventional caging devices, it is necessary to level the missile or target in pitch, and to cage the gyro while the target is so leveled, since otherwise the gyro might not have sufficient time to gravity erect before launching. The method utilized in the present invention of caging the gyro directly to gravity vertical precludes the complicated pitch leveling procedure and makes it unnecessary to delay launching until sufficient time has elapsed for the gyro to gravity erect.

It is also important to case erect the gyro spin axis about the roll axis prior to launching from a rotary launcher. Since the wings of the aircraft are horizontally positioned prior to launching, the gyro spin axis will be case erected to a position which will assure proper flight of the craft after leaving the launcher. When conventional gyroscopes with gravity erection in roll are utilized, the gyro will be precessed during rotary launching with the result that the craft may go into a turn when released from the launcher.

It is therefore an object of this invention to provide a simple and reliable reference gyro capable of establishing a roll reference plane about which an aircraft may be stabilized without likelihood of an appreciable variation from a straight course.

Another object of the invention is to provide a reference gyroscope which is capable of automatically trimming the aircraft in roll to provide a straight flying course and which provides an accurate vertical reference plane in pitch.

Another object of the invention is to provide a reference gyroscope which is erected by a gravity sensitive device in pitch and by a direction sensitive device in roll.

A still further object is the provision of means for gravity erecting the reference gyroscope about the pitch axis and for case erecting the reference gyroscope about the roll axis prior to flight.

These, and other objects of the invention, not specifically enumerated above, will become obvious from the following description in which.

Figure 2:
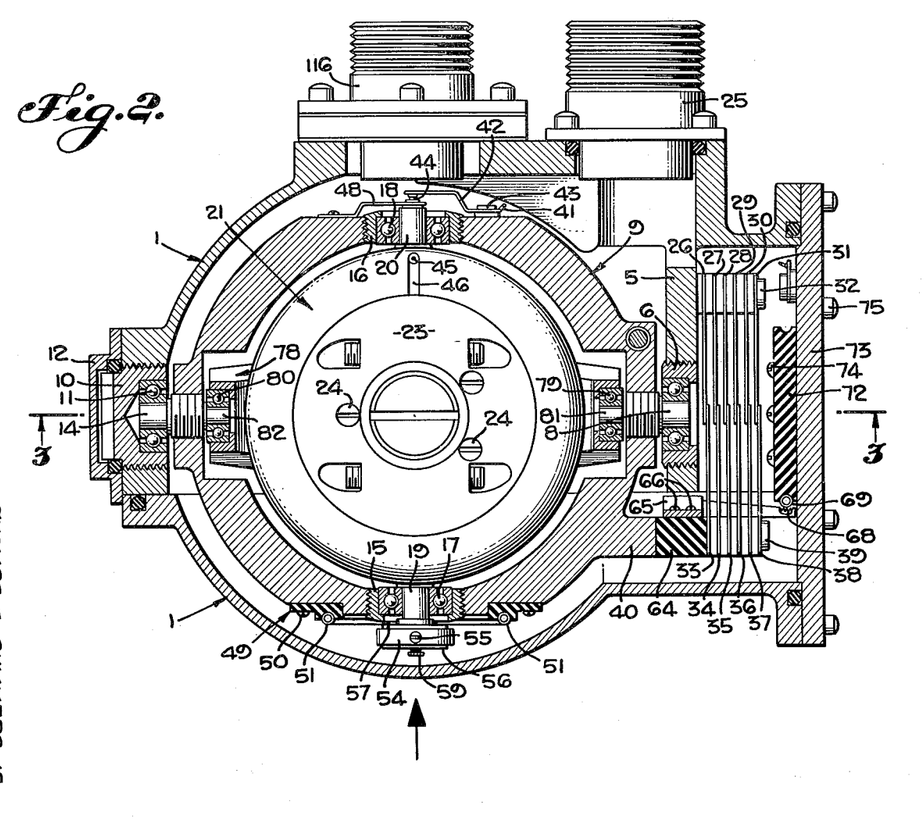
Fig. 2 is a horizontal section of the reference gyroscope taken along line 2—2 of Fig. 1.
Figure 3:
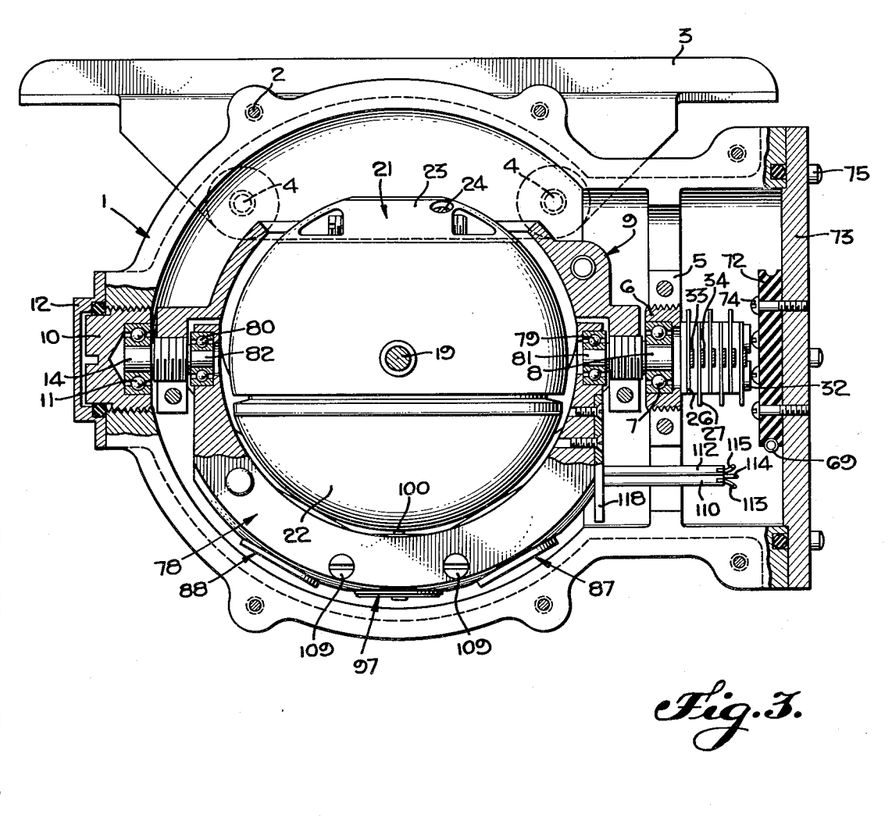
Fig. 3 is a vertical section of the reference gyroscope taken along line 3—3 of Fig. 2, showing the inner gimbal in elevation.
Figure 4:
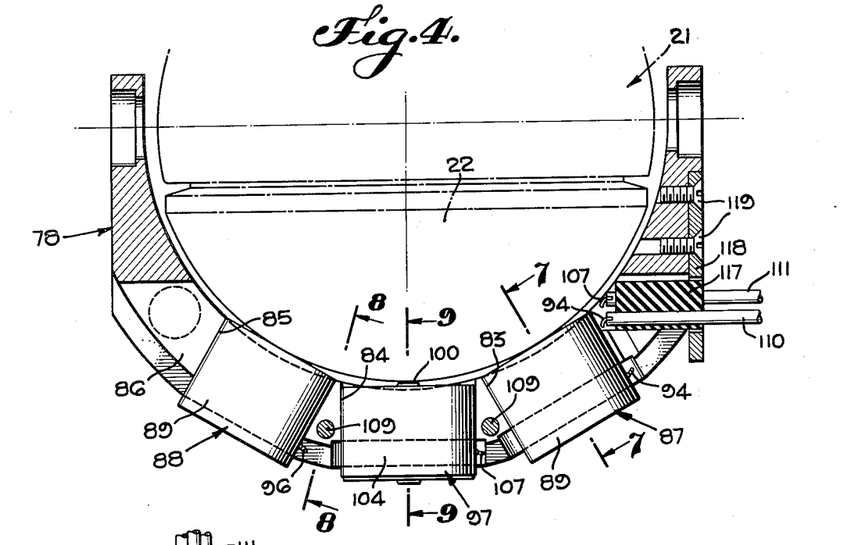
Fig. 4 is a vertical section of the pendulous bail taken along line 4—4 of Fig. 5 and illustrating the two electromagnetic erectors and the friction erector.
Figures 5, 6:
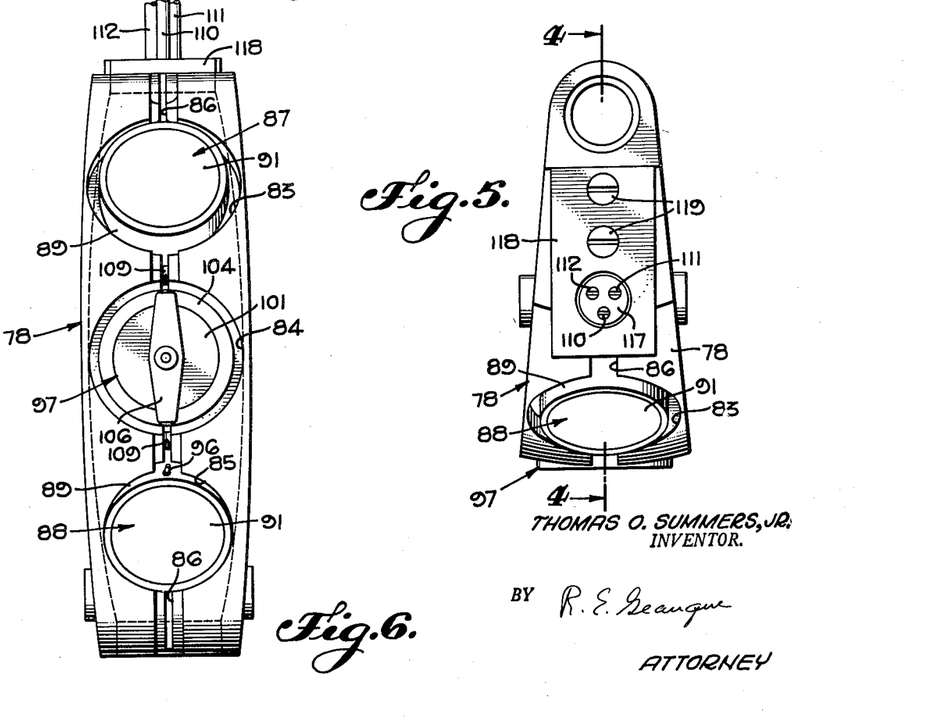
Fig. 5 is an end-elevational view of the pendulous bail, showing one of the electromagnetic erectors.
Fig. 6 is a bottom-plan view of the pendulous bail, showing the erectors mounted thereon.

The embodiment of the present invention, which has been chosen for illustration and description, comprises a reference gyroscope supported within a divided casing 1 with the casing sections held together by screws 2. A pair of mounting brackets 3 (only one of which is shown) are secured to divided casing 1 by screws 4 and serve to support both the casing and the reference gyroscope within the craft. The direction of travel of the craft is indicated by the arrow shown in Fig. 2. Projecting into the interior of the casing is a casing extension 5 which is provided with an opening for receiving a screw threaded cylindrical member 6. The member 6 retains the outer race for ball bearings 7 while the inner race is supported upon shaft 8. One section of shaft 8 is secured in an opening in outer gimbal 9 so that bearings 7 serve as one pivotal support for the outer gimbal (see Fig. 2). A second cylindrical member 10 is threaded into an opening in casing 1 and retains the outer race for ball bearings 11. A cover plate 12 is fastened to casing 1 by screws 13 to protect the member 10. The inner race for bearings 11 is mounted on shaft 14 which has a threaded section secured in an opening in outer gimbal 9 so that bearings 11 serve as the other pivotal support for the outer gimbal.

The openings in outer gimbal 9 are positioned 90° from shafts 8 and 14 and receive cylindrical members 15 and 16 which retain the outer races for ball bearings 17 and 18 respectively. The inner races for bearings 17 and 18 are supported on shafts 19 and 20 respectively which are integral with the inner gimbal 21. The bearings 17 and 18 therefore provide the two pivotal supports for the inner gimbal 21. The gyroscope motor (not shown) is mounted within inner gimbal 21 and provides a means for rotating the dome 22 which is integral with the gyroscope rotor. A balancing member 23 is secured to the inner gimbal by screws 24 so that the inner gimbal can be accurately balanced.

Figure 1:
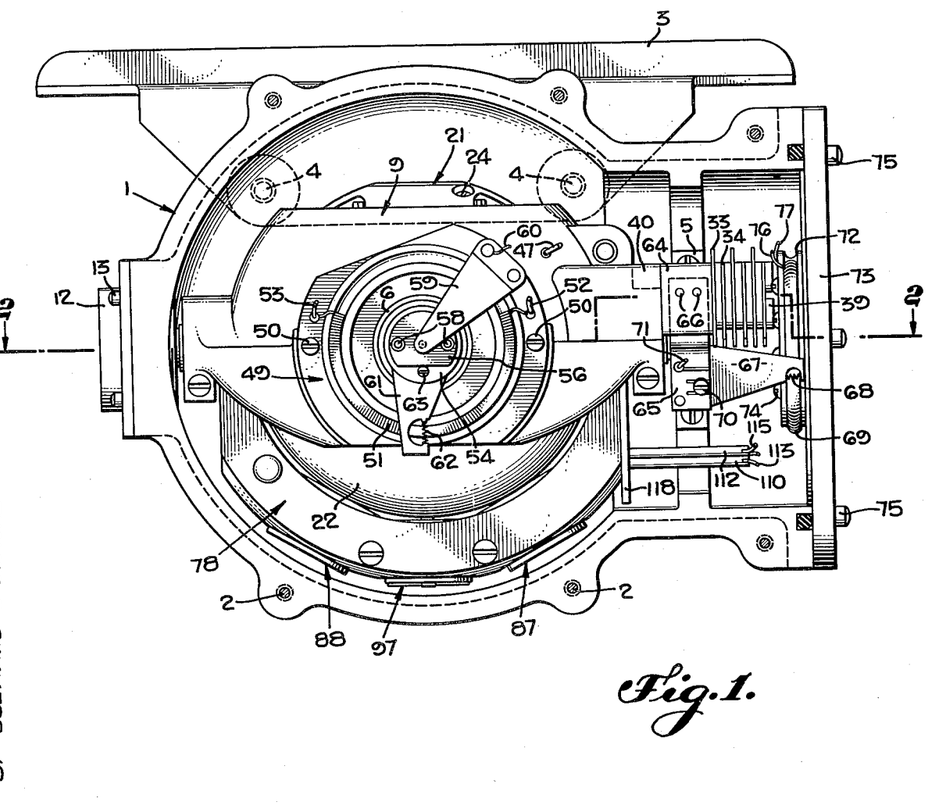
Fig. 1 is a front elevational view of the reference gyroscope with the gyro casing removed to illustrate the roll pick-off assembly.

The electrical power for the reference gyroscope is supplied through cannon plug 25 containing eight leads (not shown). One of the leads is connected to each of the electrical contact plates 26, 27, 28, 29, 30 and 31 which are mounted on casing extension 5 by means of insulated screws 32, and separated from one another by insulated blocks. A second series of electrical contact plates 33, 34, 35, 36, 37 and 38 are secured by means of insulated screws 39 to an arm 40 integral with outer gimbal 9 and these plates continuously bear against contact plates 26, 27, 28, 29, 30 and 31 respectively. Since the second series of contact plates move with the outer gimbal, electrical energy can be communicated between the relatively moving parts of the gyroscope. Contact plate 33 supplies electrical power to the gyro motor through lead 41, which is attached to conducting plate 42 mounted on outer gimbal 9 by means of insulated screw 43 (see Fig 2). A projection on plate 42 contacts a silver plug 44 which is insulated from and which passes through shaft 20. The plug 44 connects with line 45 leading to the gyro motor along groove 46 in the inner gimbal. Contact plate 34 is connected to the outer gimbal by means of lead 47 (see Fig. 1) and serves to ground the outer gimbal. The return lead for the gyro motor is attached to the inner gimbal which is grounded to the outer gimbal through shaft 20 and plate 48 in contact with the shaft. Thus, a complete circuit is provided for the gyro motor.

*Roll pick-off assembly*

An insulated ring 49 is secured by means of screws 50 to the surface of outer gimbal 9 and the ring contains a groove for mounting potentiometer winding 51. Lead 52 connects one end of winding 51 with contact plate 35 while lead 53 connects the other end of winding 51 with contact plate 36. An insulated disk 54 is retained on the end of shaft 19, which extends through the outer gimbal, by a set screw 55. Conducting silver plates 56 and 57 are mounted on opposite faces of disk 54 by conducting rivets 58, which also serve as the electrical connection between the plates. A member 59 is carried by ring 49 and continually bears against silver plate 56. The member 59 is connected by lead 60 to a source of electrical power at contact plate 37. Secured to silver plate 57 is a conducting wiper arm 61 which carries a wiper 62 in a position to contact winding 51. The screw 63 passes through disk 54 and its end bears against wiper arm 61 so that the pressure of wiper 62 against winding 51 can be adjusted. Since the wiper 62 is secured to the inner gimbal 21, rolling movements of the craft will cause the wiper 62 to change positions on winding 51 and to vary the output through leads 52 and 53.

*Pitch pick-off assembly*

The arm 40, integral with the outer gimbal, carries an insulated section 64 and a bent aluminum strap member 65 is mounted on section 64 by means of screw 66. A wiper arm 67 is riveted to strap member 65 and contains a wiper 68 which continually bears against potentiometer winding 69. The end of screw 70, threaded in member 65, bears against wiper arm 67 so that the pressure of wiper 68 against winding 69 can be adjusted. The lead 71 and wiper arm 67 serve to connect to electrical potential at contact plate 38 with the wiper 68. Winding 69 is positioned in a groove in insulated disk 72 which is secured to cover plate 73 by means of screws 74. Screws 75 serve to fasten the cover plate 73 to divided casing 1 while leads 76 and 77 connect the ends of the winding 69 directly with cannon plug 25. Since the wiper 68 is secured to the outer gimbal 9, pitching movements of the craft will cause the wiper 68 to change positions on winding 69 and to vary the output through leads 76 and 77.

*Erecting means*

Figures 7, 8:
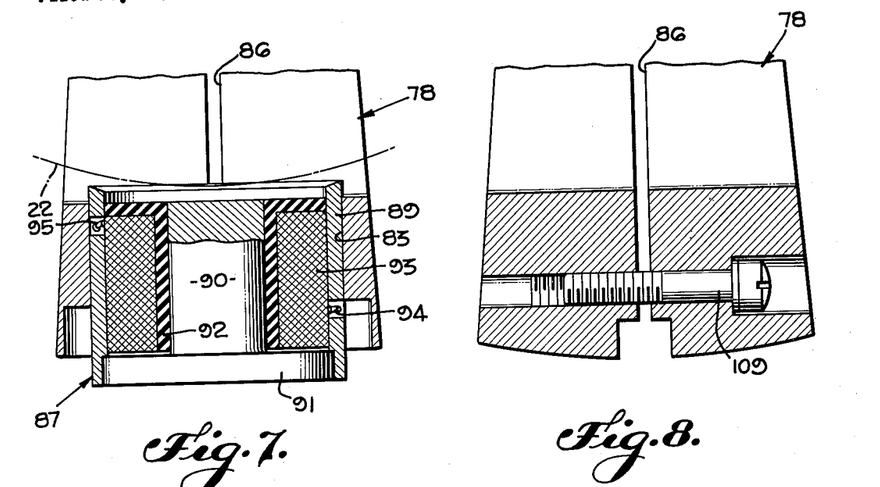
Fig. 7 is a transverse section of one of the electromagnetic erectors taken along line 7—7 of Fig. 4.
Fig. 8 is a transverse section of the bail taken along line 8—8 of Fig. 4.

A curved pendulous bail 78 has openings at each end for receiving the outer races for ball bearings 79 and 80. The inner race for bearings 79 is supported by a shaft 81 which is an extension of shaft 8 while the inner race for bearings 80 is supported by a shaft 82 extending from shaft 14. The shafts 81 and 82 provide two pivotal supports for bail 78 so that the bail is free to move around the surface of gyro dome 22. The body of bail 78 contains three openings 83, 84 and 85 connected by a lengthwise slit 86. The openings 83 and 85 are equally positioned, one on each side of the normally vertical plane passing through the roll gimbal axis of the reference gyro while the axis of opening 84 is positioned in this plane. Electromagnetic erecting devices 87 and 88 are positioned in openings 83 and 85 respectively in close proximity to gyro dome 22 and are identical in structure. Erecting device 87 is shown in Fig. 7 and comprises a cylindrical housing 89 which fits snugly in opening 83. The core 90 of the electromagnet has an enlarged section 91 which is received by a cut away portion at one end of housing 89. A cylindrical member 92 separates core 90 from electromagnet winding 93 and the flanged portion of member 92 serves to retain the winding in position within housing 89. Energy for operating the electromagnetic erecting device 87 is supplied through lead 94 to winding 93 and the winding is grounded to the bail by lead 95. Electromagnetic erecting device 88 is operated by energy supplied by lead 96 and the magnet winding is grounded by a lead (not shown) attached to the bail 78.

Figure 9:
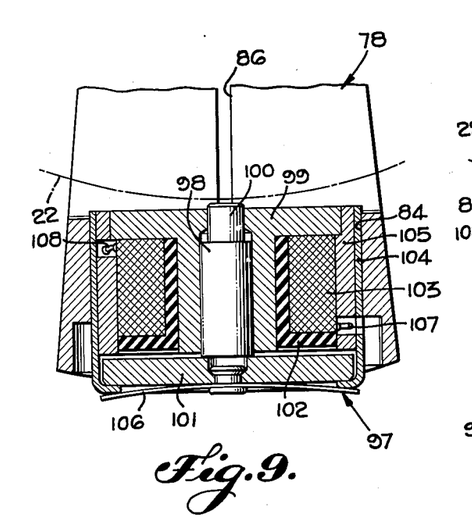
Fig. 9 is a transverse section of the friction erector taken along line 9—9 of Fig. 4, showing the erector in the non-engaging position.
Figure 10:
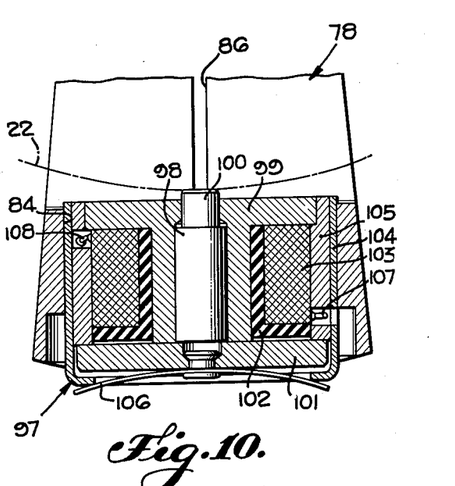
Fig. 10 is a transverse section of the friction erector similar to Fig. 9, showing the erector in engaging position.

A frictional erecting device 97 is positioned in opening 84 and consists of a plunger 98 which is slidable in an opening in core 99. The plunger 98 has a frictional erector 100 at an end which can be moved into contact with gyro dome 22 and the armature 101 is secured to the other end of the plunger. A flanged member 102 is mounted on the body of core 99 and retains winding 103 in position. The shell 104 and cylindrical member 105 serve to secure the component parts of erecting device 97 within the opening 84. One end of the shell 104 is bent inwardly so as to confine the movements of armature 101 to the space between the end of core 99 and the bent end of the shell 104. The center of leaf spring 106 is fastened to the end of plunger 98 and the ends of the leaf spring bear against the outside surface of the bent end of the shell 104. The spring 106 therefore serves to keep the erecting section 100 away from the gyro dome 22 until the winding 103 is energized. Lead 107 supplies electrical energy to winding 103 and the winding is grounded to the bail by lead 108. When winding 103 is energized, the plunger 98 is moved toward dome 22 against the force of spring 106 until the erector 100 comes into contact with the dome 22. The normal position of erector 100 is shown in Fig. 9 while the position assumed by the erector when winding 103 is energized is illustrated in Fig. 10.

The body of bail 78 contains the slit 86 in order to make the bail flexible enough that the erecting devices 87, 88 and 97 can be easily inserted into opening 83, 84 and 85 respectively. A pair of screws 109 are positioned transverse of the bail so that after the erecting devices have been positioned in the bail, the screws can be tightened to clamp the erectors within the bail. The openings 83, 84 and 85 and slit 86 have enlarged positions at the lower surface of the bail to provide space for leads 94, 107 and 96 to pass along the bottom of the bail. Three electrical posts 110, 111 and 112 are connected at one end with leads 94, 107 and 96 respectively and at the other end with leads 113, 114 and 115 respectively which enter the divided casing 1 through cannon plug 116. The posts are positioned in an insulated plug 117 which is carried by insulated plate 118 secured to bail 78 by means of screws 119.

The erecting devices 87, 88 and 97 operate on the principle explained in connection with caging shown and described in the U. S. Patent No. 2,412,481 to T. O. Summers, Jr., dated December 10, 1946. The electromagnetic devices 87 and 88 are positioned sufficiently close to the gyro dome so that when either device is energized, an electromagnet field is produced which is strong enough to provide an appreciable eddy current drag on the gyro dome. This drag produces a force on the dome in a direction at right angles to a line between the center of the electromagnetic field and the spin axis of the dome. This force therefore will cause the gyroscope to precess toward the electromagnetic field until the spin axis of the dome is positioned directly in line with the erecting device producing the field. Since the bail 78 is gravity sensitive about the pitch axis of the aircraft, either electromagnetic erecting device when energized will be capable of gravity-erecting the gyroscope about the pitch axis. Also, the energization of either electromagnet will erect the spin axis of gyroscope about the roll axis in a direction depending upon which electromagnet is energized. The erection of the spin axis in roll is under the control of a single degree of freedom gyroscope which is sensitive to turning of the aircraft and which selectively energizes the erecting devices 87 and 88 so as to maintain the proper roll reference position of the spin axis of the reference gyroscope.

The frictional erecting device 97 is utilized to cage the reference gyro by bringing the spin axis into contact with erector 100. When the device 97 is energized, the erector 100 will frictionally engage the dome 22 and will exert a force on the gyro dome which is at right angles to a line between the spin axis and the erector. This force will cause the gyro to precess and move the spin axis toward the erector with the result that the spin axis is rapidly case erected about the roll axis to the normally vertical plane passing through the roll gimbal axis of the gyro and is simultaneously erected in pitch to true gravity vertical. The erecting device 97 can be operated through a manually controlled switch so that the gyro can be caged prior to launching.

*Rate gyro*

Figure 11:
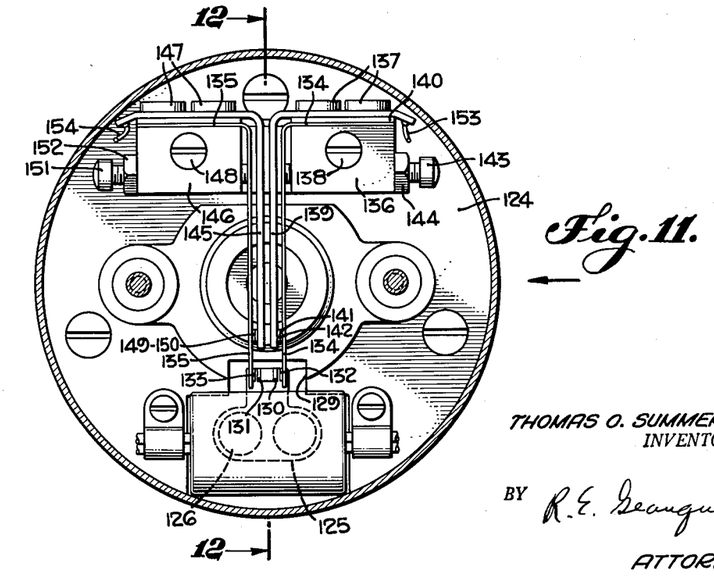
Fig. 11 is a vertical section of the miniature rate gyroscope taken along line 11—11 of Fig. 12 and showing the rate gyroscope in side elevation.
Figure 12:
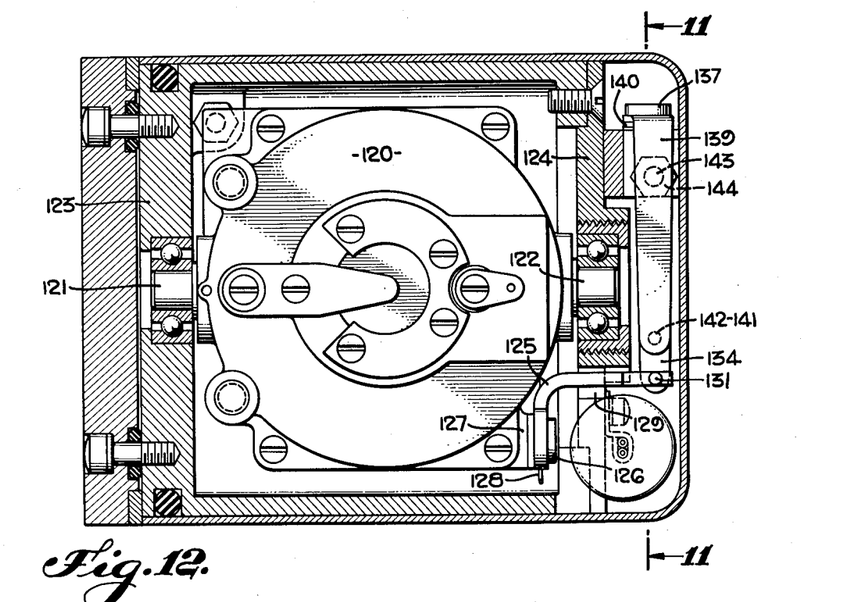
Fig. 12 is a transverse section of the miniature rate gyroscope taken along line 12—12 of Fig. 11 and showing the gyro-operated switch in front elevation.

The rate gyro utilized to develop signals in response to turning movements of the craft is shown in Figs. 11 and 12. The arrow of Fig. 11 indicates the direction of flight of the craft and the spin axis of the rate gyro rotor (not shown) normally lies along the fore and aft axis of the aircraft. The gyro rotor is mounted in a gimbal 120 which is pivotally supported by shafts 121 and 122 retained by ball bearings in casing members 123 and 124 respectively. The axial line of shafts 121 and 122 is transverse of the aircraft and perpendicular to the spin axis of the rate gyro rotor. The gyro motor (not shown) is mounted within gimbal 120 and is supplied with electrical energy in order to drive the gyro rotor. A switch arm 125 is mounted, by means of screws 126, on member 127 which is secured to gimbal 120. The arm 125 is insulated from member 127 and is supplied with electrical energy through lead 128. An opening 129 in casing member 124 allows the arm 125 to pass through the member and to move relative to the member. Two contacts 130 and 131 are carried on opposite sides of the end of arm 125 and are positioned opposite contacts 132 and 133 respectively. The contacts 132 and 133 are mounted at the ends of bent flexible arms 134 and 135 respectively.

The flexible arm 134 is secured to block 136 by insulated screws 137 and the block 136 is mounted on casing member 124 by screw 138. A bent contact plate 139 is also attached to block 136 by means of screws 137 and is insulated from the arm 134 by a member 140. The arm 134 and contact plate 139 carry contacts 141 and 142 respectively which are positioned opposite each other with contact 141 spaced somewhat from contact 132. The contact 141 is normally held against contact 142 by means of pressure exerted against flexible arm 134 by the end of screw 143 which is positioned in block 136 and locked in place by nut 144. In a similar manner, the flexible arm 135 and the bent contact plate 145 are secured to block 146 by insulated screws 147 and the block is fastened to casing member 124 by screw 148. The arm 135 and the contact plate 145 carry contacts 149 and 150 respectively which are positioned opposite each other with contact 149 spaced from contact 133. The end of screw 151, which is locked in block 146 by nut 152, bears against flexible arm 135 to normally hold contact 149 against contact 150. Leads 153 and 154 connect the contact plates 139 and 145 with leads 94 and 96 respectively of the electromagnetic erecting devices 87 and 88, which are mounted by the pendulous bail of the reference gyro.

The rate gyro is so positioned that the gimbal 120 will precess about its axis in one direction or another depending upon the direction in which the craft is turning. If the aircraft starts to turn to the right, the gimbal will move switch arm 125 so that contact 130 will bear against contact 132 and complete a circuit to lead 153 through flexible arm 134, contacts 141 and 142 and contact plate 139. If the aircraft is purposely put into a right turn, a large precessional force will be developed on arm 125 which will act against the spring force of flexible arm 134 and move contact 141 away from contact 142 to break the circuit established through contacts 130 and 131. If the aircraft starts to turn to the left, the gimbal 120 will move contact 131 against contact 133 and complete a circuit to lead 154 through flexible arm 135, contacts 149 and 150 and contact plate 145. When the aircraft is purposely turned to the left, the large precessional force developed on arm 125 will act against the spring force of flexible arm 135 and move contact 149 away from contact 150 to break the circuit. It is therefore obvious that the rate gyro provides a means of erecting the spin axis of the reference gyro in response to turning movements of the aircraft by energizing the erecting devices 87 and 88.

*Electrical control circuit*

Figure 13:
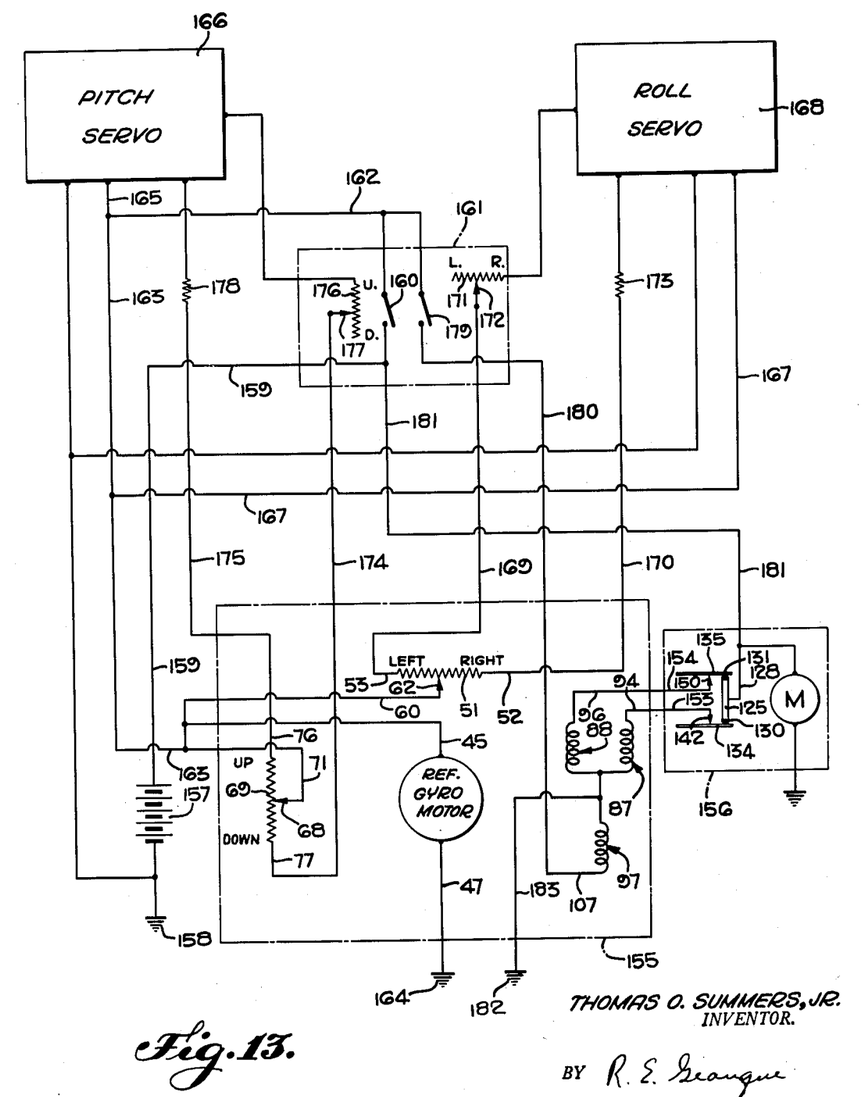
Fig. 13 is a diagrammatic sketch of the electrical circuit for control signals produced by the gyroscopic instrument.

The reference gyroscope is illustrated in Fig. 13 by box 155 while the rate gyroscope is designated as box 156. A source of electrical energy 157 is grounded at 158 and is connected by line 159 to a masterswitch 160 on the control panel, which is illustrated by box 161. When switch 160 is closed, energy is supplied through lines 162 and 163 to wipers 62 and 68 and to the reference gyro motor which is grounded at 164. A branch line 165 from line 162 supplies power to operate the pitch servo 166 while a line 167 supplies power to operate the roll servo 168. The ends of winding 51 are connected to the roll servo 168 through lines 169 and 170. The line 169 contains an adjustable potentiometer which consists of a winding 171 and a wiper 172 while the line 170 contains a winding 173 having one-half the resistance of winding 171. The ends of winding 69 are connected to the pitch servo 166 through lines 174 and 175. The line 174 contains an adjustable potentiometer which consists of a winding 176 and a wiper 177. The line 175 contains a winding 178 which has one-half the resistance of winding 176.

The servos 166 and 168 can be of the opposed magnetic clutch type wherein each servo has two clutches which coact with shafts rotating in opposite directions. The resultant output of the two clutches, working against each other, will then be proportional to the difference in current flowing through the two clutches and this output will operate the control surfaces of the aircraft against the aerodynamic forces which try to streamline them. It is therefore possible to adjust the output of the pitch servo in accordance with the difference in currents in lines 174 and 175 and this difference in currents is determined by the positions assumed by wipers 68 and 177. Also, the output of roll servo 168 is determined by the difference in currents in lines 169 and 170 and this difference is determined by the position assumed by wipers 62 and 172.

A switch 179 on the control panel connects power line 162 with line 180 which leads to the frictional erecting device 97. When switch 179 is closed, the device 97 is energized with the result that the reference gyro spin axis will be caged. A line 181 connects with power line 159 and continually supplies electrical energy to switch arm 125. When the rate gyro precesses in response to a right turn of the craft, the erecting device 87 will be energized by switch arm 125, with the result that the reference gyro spin axis will be moved about the inner gimbal axis toward the erecting device 87 and at the same time will be gravity erected about the outer gimbal axis. If the rate gyro precesses in response to a left turn of the craft, the erecting device 88 will be energized by switch arm 125 so that the reference gyro will be moved about the inner gimbal axis toward the erecting device 88 and at the same time will be gravity erected about the outer gimbal axis. The erecting devices 87 and 88 will be inoperative during the time the aircraft is flying straight and during controlled changes in course of the craft. All three erecting devices 87, 88 and 97 are grounded at point 182 through line 183.

*Operation*

The operation of the present invention in controlling the flight of an aircraft will now be described. Prior to launching, the switch 179 will be closed long enough for erecting device 97 to cage the reference gyro by case erecting the spin axis to the normally vertical plane of the roll gimbal axis and by gravity erecting the spin axis to true gravity vertical about the pitch axis. By erecting the spin axis to the gravity vertical in pitch, it is unnecessary to level the aircraft in pitch prior to launching as is necessary when the craft is equipped with a gyro which is caged to the pitch null position. Also, by case erecting the spin axis about the roll axis prior to launching, the gyro will maintain a roll reference position which will assure substantially straight flight of the craft upon leaving the launcher, even though a rotary launcher is used. If, during launching, the craft has a downward or upward pitch, the wiper 68 will be positioned closer to lead 77 or to lead 76 and unequal currents will flow in lines 174 and 175. This will cause the pitch servo to move the elevators in a direction to level off the craft after leaving the launcher and to position the center of winding 69 in contact with wiper 68. If the wings of the craft are tipped from the horizontal during launching, the wiper 62 will be positioned to one side or the other of winding 51 and the elevators will be moved to a position which will cause the craft to level off upon leaving the launcher. After the craft has been launched, it will assume an attitude about the pitch axis which is determined by the gravity vertical reference position of the gyro spin axis. Thus, the gravity vertical position of wiper 68 provides a level flight reference for the craft during launching and during the flight of the craft. If it is desired to control the altitude of the aircraft, the pitch of the aircraft can be adjusted to the desired amount of moving the wiper 177 up or down to raise or lower the nose of the craft. When the wiper 177 is moved, unequal currents will flow in lines 174 and 175 and the elevators will be operated in the proper direction to obtain the change in pitch. The craft can be levelled off at any time by returning the wiper 177 to its original position.

The electromagnetic erecting devices 87 and 88 serve to keep the craft on a straight path during flight. If the craft is in perfect trim about its roll axis, the wiper 62 will normally remain in the center of winding 51 and the craft will fly straight with the ailerons streamlined. Any temporary deviations from straight flight will move the winding 51 relative to wiper 62 and energize the roll servo in a manner to correct for the deviation. However, if the craft is out of trim about its roll axis, the wiper 62 must be positioned to one side or the other of the winding center so that the difference in current in lines 169 and 170 will be sufficient to hold the ailerons in a position to correct for the out-of-trim condition. If the craft turns to the right, the rate gyro will sense this turning and will cause the spin axis of the reference gyro to move about the roll axis toward the erecting device 87. The wiper 62 will move with the spin axis and will approach the lead 52 at the right side of winding 62. Due to the change of position of wiper arm 62, the difference in currents in lines 169 and 170 will be adjusted, so that the roll servo will move the ailerons in a direction to straighten out the craft. When the wiper 62 has been properly positioned and the craft is flying straight, the erecting device 87 will be inactive since no precession of the rate gyro results during straight flight. If the craft turns to the left, the rate gyro will energize erecting device 88 in order to move wiper 62 toward the left side of winding 51. After the wiper has assumed a position on the winding which will result in straight flight, the erecting device 88 will be de-energized. Momentary deviations from straight flight, which result after the wiper and spin axis have been positioned for straight flight, will be corrected for by movements of the winding 51 relative to the wiper 62 since the erecting devices 87 and 88 will not have time to appreciably move the wiper before the deviations are corrected.

In order to purposely turn the craft to the right or left, the wiper 172 can be moved to the right or the left and thereby adjust the output of roll servo 168 by adjusting the difference in current between lines 169 and 170. During such a turn, the rate gyro will develop considerable precessional force and, depending upon the direction of turn, will bend either flexible arm 134 or 135 sufficiently to disconnect the corresponding erecting device. Thus, the erecting devices 87 and 88 become incapable of erecting the spin axis of the reference gyro during desired changes in course. After the turn is completed, the wiper 172 can be returned to its initial position and the reference gyro will again provide a straight flight reference.

It is apparent that the present invention provides a simple and reliable means of controlling the flight of the craft. During the time the erecting device 87 or 88 is erecting the spin axis of the reference gyro about the roll axis, the spin axis is also being erected to the true gravity vertical about the pitch axis. Any off-course position of the craft during normal flight can only result when the craft is headed in the wrong direction since this invention will constantly maintain the craft in the roll attitude required for straight flight. Also, by using the pendulous bail to erect the reference gyro before launching, the craft can be safely launched without the danger of destroying the craft.

For the purposes of the present disclosure, the terms "craft," "aircraft" and "missile" are interpreted as including all types of air, land and water craft, and all types of missiles and vehicles, in addition to the ordinary connotations associated with the words. Various modifications are contemplated and may obviously be resorted to by those skilled in the art, without departing from the spirit and scope of the invention as hereinafter defined by the appended claims.

What is claimed is:

1. In a gyroscopic control instrument for a movable craft, a reference gyroscope having inner and outer gimbals, a gyro rotor supported by one of said gimbals, means for erecting said rotor about the pitch axis to the gravity vertical and means responsive to turning of the craft for erecting said rotor about the roll axis to a straight flight reference position.

2. In a gyroscopic control instrument for a movable craft, a reference gyroscope having inner and outer gimbals, a gyro rotor supported by one of said gimbals, means energized upon turning of the craft for erecting said rotor about the pitch axis to the gravity vertical and for simultaneously erecting said rotor about the roll axis to a reference position resulting in straight flight of the craft.

3. In a gyroscopic control instrument for a movable craft, a reference gyroscope having inner and outer gimbals, a gyro rotor supported by one of said gimbals, caging means operative prior to flight for gravity erecting said rotor about the pitch axis of said craft and simultaneously case erecting said rotor about the roll axis of said craft and means operative during flight for erecting said rotor to gravity vertical about said pitch axis and simultaneously erecting said rotor about said roll axis to a reference position corresponding to straight flight of the craft.

4. A gyroscopic control instrument as defined in claim 3 having means positioned by said gyro rotor for controlling the flight of said craft.

5. In a gyroscopic control instrument for a movable craft, a reference gyroscope having inner and outer gimbals, a gyro rotor supported by one of said gimbals, a pendulous bail pivotally mounted about the pitch axis of said craft and means mounted on said bail for erecting said rotor to the gravity vertical about the pitch axis of said craft and simultaneously erecting said rotor about the roll axis of said craft in response to turning movement of said craft.

6. In a gyroscopic control instrument for a movable craft, a reference gyroscope having inner and outer gimbals, a gyro rotor supported by one of said gimbals, gravity sensitive means mounted about the pitch axis of said craft, erecting means mounted on said gravity sensitive means, means for energizing said erecting means in response to turning movement of said craft, said erecting means being operative to gravity erect said rotor about the pitch axis and to erect said rotor about the roll axis to a reference position corresponding to straight flight of the craft.

7. In a gyroscopic control instrument for a movable craft, a reference gyroscope having inner and outer gimbals, a gyro rotor supported by one of said gimbals, gravity sensitive means mounted about the pitch axis of said craft, first and second erecting means mounted on said gravity sensitive means, means for energizing said first erecting means prior to flight to cage said rotor, means for energizing said second erecting means in response to turning movement of said craft, said second erecting means being operative during flight to gravity erect said rotor about the pitch axis and to erect said rotor to its straight flight position about the roll axis.

8. In a gyroscopic control instrument, a reference gyroscope having inner and outer gimbals, a gyro rotor supported by said inner gimbal, a pendulous bail pivotally mounted about the axis of said outer gimbal, a first erecting device carried by said bail and positioned in a symmetrical plane perpendicular to said outer gimbal axis, second and third erecting devices carried by said bail and positioned on opposite sides of said first erecting device, said first, second and third erecting devices being selectively energized to erect said rotor.

9. A gyroscopic control instrument as set forth in claim 8 having means for energizing said first erecting device prior to flight to gravity erect said rotor about the outer gimbal axis and simultaneously case erect said rotor about the inner gimbal axis and direction sensitive means for energizing said second and third erecting devices during flight to erect said rotor to the gravity vertical position about the outer gimbal axis and to the straight flight reference position about the inner gimbal axis.

10. In a gyroscopic control instrument for a movable craft, a reference gyroscope having inner and outer gimbals, a gyro rotor supported by one of said gimbals, a pendulous bail mounted about the pitch axis of said craft, first and second erecting devices mounted on said bail and positioned on opposite sides of a plane passing through the inner gimbal axis and perpendicular to the outer gimbal axis, a rate gyro positioned with its precessional axis transverse of said craft so as to be sensitive to either right or left turns of said craft, first means operated by said rate gyro during a right turn to energize said first erecting device and second means operated by said rate gyro during a left turn to energize said second erecting device, said rotor being moved about thhe roll axis by said first and second erecting means until it assumes a position about which the craft will fly straight.

11. In a gyroscopic control instrument as set forth in claim 10 wherein a third erecting device is mounted on said bail and positioned in said plane, said third erecting device being energized prior to flight to gravity erect said rotor about the pitch axis of said craft and to case erect said rotor about the roll axis of said craft.

12. In a gyroscopic control instrument for a movable craft, a reference gyroscope having inner and outer gimbals, a gyro rotor supported by one of said gimbals, erecting means operative during flight for moving said rotor about the roll axis of said craft to a straight flight reference position and means responsive to turning of said craft for energizing said erecting means.

13. A gyroscopic control instrument for a movable craft comprising a reference gyro mounted within said craft, a first member positioned by said gyro about the pitch axis of said craft to control a pitch servo, a second member positioned by said gyro about the roll axis of said craft to control a roll servo and means responsive to turning of said craft for erecting said gyro to gravity vertical about the pitch axis and to a straight flight reference position about the roll axis.

14. A gyroscopic control instrument for a movable craft comprising a reference gyro mounted within said craft, a first wiper positioned by said gyro about the pitch axis of said craft, a first winding movable with said craft about the pitch axis, a second wiper positioned by said gyro about the roll axis of said craft, a second winding movable with said craft about the roll axis, a pitch servo having an output determined by the position of the first wiper on the first winding, a roll servo having an output determined by the position of the second wiper on the second winding, means for erecting said gyro prior to flight to provide a level flight position for said first wiper, and means for erecting said gyro during flight to provide a level flight position for said first wiper and a straight flight position for said second wiper.

15. A gyroscopic control instrument as set forth in claim 14 wherein said last mentioned means includes a direction sensitive element responsive to turning movement of said craft.

16. In a gyroscopic control instrument for a movable craft, a reference gyroscope having inner and outer gimbals, a gyro rotor supported by the inner gimbal and having a curved dome integral therewith, a pendulous bail pivotally mounted about the pitch axis of said aircraft in close proximity to said dome, a friction erector positioned on said bail in a plane of symmetry of said craft perpendicular to the axial line of the outer gimbal, means for moving said friction erector into contact with said dome to produce a frictional drag on said dome, first and second electromagnets mounted on said bail and positioned on opposite sides of said plane, a rate gyro positioned in said craft to be responsive to right and left turning movements, a first switch connected to said first electromagnet and closed by said rate gyro during a right turn, a second switch connected to said second electromagnet and closed by said rate gyro during a left turn, said first and second electromagnets being positioned near enough to said dome to produce an eddy current drag on said rotor to erect said rotor toward either energized electromagnet and said friction erector being energized prior to flight to cage said rotor.

17. In a gyroscopic control instrument for a movable craft, a reference gyroscope having pitch and roll gimbals, a gyro rotor supported by one of said gimbals, means operative during flight for erecting said rotor about the pitch axis to the gravity vertical and means including a rate gyro for erecting said rotor about the roll axis to a reference position about which the craft will fly straight.

18. In a gyroscopic control instrument for a movable craft, a reference gyroscope having at least a roll gimbal, a gyro rotor supported by said gimbal and means responsive to turning of said craft for erecting said rotor about the roll axis of said craft to a reference position about which the craft will fly straight.

19. In a gyroscpic control instrument for a movable craft, a reference gyro having a gyro rotor free to move about the roll axis of said craft, erecting means selectively operative to move said rotor about the roll axis of said craft, a rate gyro mounted upon said craft so as to precess upon turning movement of said craft, the precession of said rate gyro causing said erecting means to move said rotor to a position where it provides a straight flight reference for the craft.

20. In a gyroscopic control instrument, a reference gyro having pitch and roll gimbals, a gyro rotor supported by one of said gimbals, gravity sensitive means pivotally mounted about the pitch axis of said craft, erecting means carried by said gravity sensitive means and operative during flight for moving said rotor about the roll axis of said craft to a straight flight reference position and means responsive to turning of said craft for energizing said erecting means.

21. In a gyroscopic control instrument for a movable craft, a reference gyro having a gyro rotor free to move about the roll axis of said craft, means responsive to the position of said rotor about the roll axis for controlling the roll attitude of said craft, a rate gyro mounted on said craft to precess upon turning of the craft and erecting means responsive to precession of the rate gyro for moving said rotor about the roll axis to a position where said control means will cause said aircraft to fly straight.

22. In a gyroscopic control instrument for a movable craft, a reference gyro having pitch and roll gimbals, a gyro rotor supported by one of said gimbals, means operative prior to flight to erect said rotor to gravity vertical about the pitch axis and case erect said rotor about the roll axis, a rate gyro mounted upon said craft so as to precess upon turning movement of said craft and erecting means operative during flight and responsive to the precession of said rate gyro to erect said rotor to gravity vertical about the pitch axis and to a reference position about the roll axis about which the craft will fly straight.

23. In a gyroscopic control instrument for a movable craft, a reference gyro having pitch and roll gimbals, a gyro rotor supported by one of said gimbals and having a spin axis, means for erecting the spin axis of the gyro about both the pitch and roll axes of the craft, first and second pickoffs adapted about said roll and pitch axes respectively to provide reference positions for the flight of the craft and a rate gyro to bias said first pickoff to provide for straight flight of said craft.

24. In a gyroscopic control instrument for a movable craft, a reference gyro having a gyro rotor free to move about the roll axis of said craft, means for erecting said rotor about the roll axis, a pickoff responsive to the position of said rotor about the roll axis to provide a roll reference for the flight of said craft and means for biasing said pickoff in response to turning movement of said craft to provide for a straight flight roll reference for the craft.

25. In a gyroscopic control instrument for a movable craft, a reference gyro equipped with pitch and roll references, means for erecting said gyro about the pitch and roll axes of said craft and means for adjusting said roll reference of said gyro in response to turning movement of the craft so as to maintain said craft on a straight course.

26. In a gyroscopic control instrument for a movable craft, a reference gyro having pitch and roll references and a spin axis, means for erecting said spin axis of said reference gyro about the roll and pitch axes of said craft and a rate gyro for adjusting said roll reference to provide for straight flight of said craft.

27. In a gyroscopic control instrument for a movable craft, a reference gyro equipped with pitch and roll references, means for erecting said reference gyro about the pitch and roll axes of said craft, means for manually adjusting said pitch reference to vary the altitude of said aircraft, means for manually adjusting said roll reference to change the direction of said craft and means responsive to turning movements of said aircraft to adjust said roll reference when said last mentioned manual means is inoperative.

28. In a gyroscopic control instrument for a movable craft, a gyro having at least one gimbal, a gyro rotor supported by said gimbal for movement about the gimbal axis to provide a flight reference thereabout, means for erecting said gyro rotor about said axis and means responsive to turning of the craft for energizing said erecting means to move said rotor about said axis and provide a flight reference corresponding to a desired direction.

29. In a gyroscopic control instrument for a movable craft, a gyroscope having at least a roll gimbal, a gyro rotor for said gyroscope, erecting means for moving said rotor about the roll axis of said craft, and direction sensitive means for energizing said erecting means in response to turning of said craft in order to move said rotor to a reference position about which the craft will fly straight.

30. In a gyroscopic control instrument for a movable craft, a gyroscope having at least a roll gimbal, a gyro rotor for said gyroscope, erecting means for erecting said rotor about the roll axis of said craft, a flight reference about said axis responsive to the position of said rotor, and direction sensitive means for biasing said reference in a manner to provide a straight flight reference for the craft.

References Cited in the file of this patent

UNITED STATES PATENTS

| | | |
|---|---|---|
| 2,137,974 | Fischel | Nov. 22, 1938 |
| 2,188,606 | Koster | Jan. 30, 1940 |
| 2,190,390 | Thiry | Feb. 13, 1940 |
| 2,297,265 | Von Manteuffel | Sept. 29, 1942 |
| 2,423,270 | Summers | July 1, 1947 |
| 2,505,021 | Weems et al. | Apr. 25, 1950 |
| 2,507,451 | Molnar et al. | May 9, 1950 |
| 2,555,165 | Turner | May 29, 1951 |
| 2,608,868 | Buhl | Sept. 2, 1952 |

FOREIGN PATENTS

| | | |
|---|---|---|
| 365,188 | Great Britain | Dec. 19, 1931 |